United States Patent [19]

Bikson et al.

[11] Patent Number: 4,826,599

[45] Date of Patent: May 2, 1989

[54] COMPOSITE MEMBRANES AND THEIR MANUFACTURE AND USE

[75] Inventors: Benjamin Bikson, Brookline; Joyce K. Nelson, Lexington, both of Mass.

[73] Assignee: Union Carbide Corporation, Danbury, Conn.

[21] Appl. No.: 72,056

[22] Filed: Jul. 10, 1987

[51] Int. Cl.$^4$ .............................................. B01D 13/01
[52] U.S. Cl. .................................. 210/500.3; 210/640; 210/321.8; 210/321.89; 210/500.36; 210/500.41; 264/41; 264/45.9; 264/178 F; 264/182
[58] Field of Search ..................... 264/41, 45.9, 178 F, 264/182; 210/500.27, 500.28, 500.29, 500.3, 500.33, 500.36, 500.23, 500.41, 321.64, 321.78, 321.79, 321.8, 321.39, 321.87, 321.88, 634, 641, 644, 640, 649, 650, 651, 652; 427/245; 428/269; 55/16, 158, 68

[56] References Cited

U.S. PATENT DOCUMENTS

| | | |
|---|---|---|
| 3,133,132 | 5/1964 | Loeb et al. . |
| 3,616,607 | 11/1971 | Klass et al. ................ 55/16 |
| 3,980,456 | 9/1976 | Browall ..................... 55/158 |
| 4,127,625 | 11/1978 | Arisaka et al. ............ 264/28 |
| 4,155,793 | 5/1979 | Salemme et al. ......... 156/246 |
| 4,214,020 | 7/1980 | Ward et al. .............. 427/296 |
| 4,230,463 | 10/1980 | Henis et al. .............. 55/16 |
| 4,243,701 | 1/1981 | Riley et al. .............. 427/244 |
| 4,467,001 | 8/1984 | Coplan et al. ........... 427/434.6 |
| 4,756,932 | 7/1988 | Puri ........................ 427/175 |
| 4,767,422 | 8/1988 | Bikson et al. ............ 55/158 |

FOREIGN PATENT DOCUMENTS 0175668  3/1986  European Pat. Off. .

OTHER PUBLICATIONS

Hackh's Chemical Dictionary; Fourth Edition; 1969; pp. 163, 381.
Dictionary of Scientific and Technical Terms; McGraw-Hill; 1976, 1974; pp. 283, 631.
I. Cabasso et al., "Composite Hollow Fiber Membranes", J. App. Polym. Sci., vol. 23, 1509–1525 (1979).

Primary Examiner—Frank Sever
Attorney, Agent, or Firm—Alvin H. Fritschler

[57] ABSTRACT

A method for producing a composite hollow fiber membrane by coating a porous hollow fiber substrate with a dilute solution of a membrane-forming composition containing a membrane-forming material and a solvent therefor by contacting the porous hollow fiber substrate with the composition, partially evaporating some of the solvent from the coated porous hollow fiber substrate, contacting the partially dried coating porous hollow fiber substrate with a coagulant and recovering the composite hollow fiber membrane. Also included are the composite hollow fiber membranes so produced and their use as permeable membranes for separating at least one fluid from at least one other fluid in a fluid mixture.

33 Claims, No Drawings

COMPOSITE MEMBRANES AND THEIR MANUFACTURE AND USE

FIELD OF THE INVENTION

This invention relates to a novel method for the manufacture of permeable membranes for the separation of fluids such as gases. More particularly, it pertains to the production of composite permeable hollow fiber membranes having improved permeation and selectivity capabilities.

DESCRIPTION OF THE PRIOR ART

Permeable membranes capable of selectively permeating one component of a fluid mixture, either liquid or gas, are considered in the art as a convenient, potentially high advantageous means for achieving desirable fluid separations. For practical commercial operations, permeable membranes must be capable of achieving an acceptable level of selectivity of separation of the gases or liquids contained in a feed stream while, at the same time, achieving a desirably high productivity of fluid separation.

Various types of permeable membranes have been proposed in the art for the carrying out of a variety of gas separation operations. Such membranes can generally be classified as being of the (1) isotropic, (2) asymmetric or (3) composite type. The so-called isotropic and asymmetric type membranes are comprised essentially of a single permeable membrane material capable of selectively separating desired components of a gas mixture. Isotropic membranes have the same density throughout the thickness thereof. Such membranes generally have the disadvantage of low permeability, i.e. low permeate flux, due to the relatively high membrane thickness necessarily associated therewith. Asymmetric membranes are distinguished by the existence of two distinct morphological regions within the membrane structure. One such region comprises a thin, dense semipermeable skin capable of selectively permeating one component of a gas mixture. The other region comprises a less dense, porous, non-selective support region that serves to preclude the collapse of the thin skin region of the membrane under pressure.

Composite membranes generally comprise a thin layer or coating of a suitable permeable membrane material superimposed on a porous substrate. The thin membrane separation layer, which determines the separation characteristics of the composite structure, is advantageously very thin so as to provide the desirably high permeability referred to above. The substrate only serves to provide a support for the thin membrane layer positioned thereon.

As the advantages of permeable membranes have become increasingly appreciated in the art, the performance requirements of such membranes have likewise increased. Thus, the art is moving in the direction of very thin membranes having desirable permeability characteristics without sacrifice of the separation, or selectivity, characteristics of the hollow fiber or other permeable membrane structure. It is thus increasingly desired that more advantageous combinations of permeability and selectivity be achieved with respect to a variety of gas separations of commercial interest. It is also desired to advance and improve the methods employed for depositing the thin membrane separation layer onto the porous substrate and to improve the uniformity of the thin membrane separation layer on the porous substrate.

As indicated above, isotropic-type membranes are not generally suitable for the achieving of such requirements. Asymmetric membranes, on the other hand, can be developed for such practical gas separation applications, but do not possess an inherent flexibility enabling them to be readily optimized for particular gas separation applications. While the thin dense, semipermeable layer of a particular asymmetric membrane material can be made thinner for increased permeability, the selectivity characteristics of said material, unless modified by particular treatment techniques, may be no more than adequate with respect to the separation of the components of the gas being treated in the particular application.

The thin skin of such asymmetric membranes, which are described in the Loeb patent, U.S. Pat. No. 3,133,132, is frequently found not to be perfect, but to contain various defects. Such defects, in the form of residual pores, minute pinholes and the like, comprise relatively large size openings through which the feed gas passed to a membrane of such material will preferentially flow. As a result, a significantly reduced amount of gas separation due to the interaction of the feed gas with the material of the permeation membrane itself will occur as a consequence of the presence of such defects in the membrane structure. In the case of asymmetric polysulfone hollow fibers, such defects result in the selectivity (as defined below) being about 1 for air as contrasted to a selectivity of about 6.0 for polysulfone that is free of defects. In a proposed solution to this problem, Henis et al., U.S. Pat. No. 4,230,463, disclosed the coating of the asymmetric membrane with a coating material having a determined intrinsic separation factor that is less than that of the material of the separation membrane. The coating procedures used by Henis et al. are described in Table XVI in columns 51 and 52 of U.S. Pat. No. 4,230,463. They involve dipping the porous hollow fiber membrane in a liquid coating material, undiluted or diluted with solvent, and allowing the excess liquid coating material to drip off; in those instances in which a solvent was present it was allowed to evaporate off. Using this approach, silicone, having a selectivity of about 2, was coated on polysulfone hollow fibers to increase the selectivity thereof from the 1–1.5 range indicated above to from 2 to 6, with such selectivity commonly approaching 6. The permeability (as defined below) of such silicone/polysulfone composites have generally been relatively low, i.e. about 0.2 or less, leading to the desire for thinner membranes, i.e. thinner dense skins, particularly in light of the increasing requirements in the art for high flux operation. Thinner membranes lead, however, to an increase in the number of defects that require repair to achieve acceptable performance. While efforts to improve this approach continue, there remains a desire in the art for other approaches to provide a desirable combination of selectivity and permeability for practical commercial operation. For such reasons, composite membranes, utilizing membrane materials selected particularly for a desired gas separation, offer the greatest opportunity, with respect to particular gas separations of commercial interest, for the achieving of desirable combinations of selectivity and permeability. It will be appreciated that composite membranes, to achieve the performance requirements desired in the art, must not only incorporate very thin membrane layers, but must comprise separation layer-substrate structures of optimum advantage for a desired gas separation operation. One such application of significant commercial interest is air separation, particularly wherein the membrane material selectively permeates oxygen for recovery as an oxygen-enriched permeate gas, with a nitrogen-enriched stream being withdrawn as non-permeate gas. There is a genuine need and desire in the art, therefore, to develop a composite-type membrane particularly suitable for air separation and other desirable gas separation operations such as the recovery of hydrogen from ammonia purge gas and from refinery gas streams, and carbon dioxide and methane separations in various operations such as tertiary oil recovery.

A large number of semi-permeable membranes of a variety of materials and forms have been proposed in the art for carrying out such separations. So-called composite membranes have been proposed wherein a thin layer of a suitable semi-permeable membrane material is superimposed on a relatively porous substrate. The separation layer is advantageously very thin in order to provide the desirably high flux referred to above. The substrate provides support for the delicate, very thin permeable membrane layer or coating superimposed thereon. Such composite membrane structures are described in the Salemme et al. patent, U.S. Pat. No. 4,155,793 and in the Klass et al. patent, U.S. Pat. No. 3,616,607, however, the composite membrane structures are not produced by the process of this invention.

It will be appreciated that membranes for such separation processes, both liquid and gas, require membranes possessing a high degree of perfection in the membrane, or separation, layer. In gas separation processes, pervaporation, perstruction and the like, the best results would obviously be obtained if the membrane layer were free of any residual pores or other imperfections. On the other hand, the membrane layer needs to be made as thin and uniform as possible in order to attain desirably high permeation rates, and thus high overall separation process productivity. In such circumstances, the presence of morphological imperfections are frequently found to occur in the thin separation layer of membrane assemblies in the form of residual pores, minute pinholes and the like. Such imperfections can be introduced into the membrane system in the course of the various typical membrane manufacturing steps, such as spinning, casting, coating, curing and membrane module manufacturing operations.

To overcome the problem of defects the Browall patent, U.S. Pat. No. 3,980,456, has disclosed the application of a second, sealing coating over the very thin membrane to cover defects caused by particulate impurities. Such treated composite structures are complex in nature and, moreover, the use of a superimposed very thin membrane on a porous support substrate has not generally provided the desired selectivity of separation without an unacceptable reduction in the flux, or permeability, of the permeate gas. The patent however does not disclose applicants' process for coating a thin membrane separation layer on a porous substrate.

In the Ward, et al. patent, U.S. Pat. No. 4,214,020, a process is disclosed that teaches coating the exterior surface of a hollow fiber membrane assembly by immersing a bundle of hollow fibers into a coating solution, and driving the coating solution into the fiber by applying pressure from the exterior to the interior of the hollow fibers. This process, leading to the formation of a continuous layer/coating on the exterior of the hollow fibers, is particularly useful in the preparation of highly selective gas separation membranes by the coating of asymmetric membranes having some residual porosity with coating solutions of materials highly permeable to gases, as described in the Henis et al. patent referred to above, but it is not the process of this invention.

In the Arisaka, et al. patent, U.S. Pat. No. 4,127,625, a process is disclosed for producing, the asymmetric hollow fibers by spinning a dope of a fiber-forming resin through the outer tube of a double tube-type spinneret into an aqueous coagulating bath to form a hollow fiber and simultaneously injecting an aqueous liquid through the inner tube of the spinneret to contact the interior of the hollow fiber. This is followed by dipping in warm water and drying. The patent does not disclose applicants' coagulation procedure for the application of a thin membrane separation layer on the surface of a preformed hollow porous substrate.

In the Riley, et al. patent, U.S. Pat. No. 4,243,701, there is disclosed a process for forming a thin film of a non-porous permeable membrane on the surface of a porous support by passing the porous support through a solution of a halogenated hydrocarbon solvent containing the permeable membrane forming prepolymer and a crosslinking agent, withdrawing the coated porous support from the solution, and then crosslinking the prepolymer at elevated temperature to form the composite membrane.

In the Coplan, et al. patent, U.S. Pat. No. 4,467,001, there is disclosed a method and apparatus for coating, drying and curing multiple filaments. The liquid coating is applied to the filament in a "U" shaped tube and drying and curing are performed in a gaseous atmosphere. There is no reference to the use of coagulants to form the thin membrane separation layer on the substrate.

In the Kraus, et al. European Patent Application No. 0 175 668 A1 there is disclosed a process for coating a porous substrate with a thin membrane separation layer. This is accomplished by impregnating the porous substrate with a solvent to fill the pores followed immediately by the application of a polymer solution to form a thin membrane separation layer on the surface of the solvent impregnated porous substrate. The solvent in the pores of the porous substrate prevents the polymer solution from entering the pores in the substrate. The composite membrane is then dried by evaporation to remove both solvents, the impregnating solvent and the solution solvent.

In an article by J. Cabasso and A. P. Tamvakis, "Composite Hollow Fiber Membranes", J. App. Polym. Sci., 23, 1509–1525 (1979), there is discussed the production of composite hollow fibers in which hollow polysulfone fibers were coated with a dilute polyethyleneimine solution, drained and then dipped into m-toluene-2,4-diisocyanate, air dried for about 10 minutes and crosslinked at 100° to 110° C. for 10 minutes. Also disclosed was coating the hollow polysulfone fibers with furan resins by the polymerization of furfuryl alcohol (4 wt. % water solution) by sulfuric acid (2 wt. %) followed by curing at 150° C. The process disclosed is not the process of this application.

SUMMARY OF THE INVENTION

A method for producing composite hollow fiber membranes by contacting a porous hollow fiber substrate with a solution of a coating material followed by coagulation of the deposited coating material by contact with a coagulation bath; the membranes themselves, and their use. The method is applicable to hollow fibers, spiral wound or any other desired form.

DETAILED DESCRIPTION OF THE INVENTION

This invention provides a process for applying a substantially uniform coating of a thin membrane separation layer on a porous substrate. The use of membrane materials to selectively separate components present in a fluid mixture is well known. They are used for liquid compositions, e.g. separation of water from a brine solution such as in the recovery of potable water from oceans or brackish aqueous sources, or for gaseous compositions, e.g. selective separation of the gases in air. The process of this invention can be used to produce semi-permeable membranes useful for any separation process; however, for convenience it will be described by the preparation of materials used for the separation of gas components from one another by the use of hollow fiber semi-permeable membrane composites.

The literature is replete with disclosures on methods for the application of a thin membrane separation layer on a porous hollow fiber substrate. Most common throughout these disclosures is the process whereby a solution of the membrane-forming material is applied to the surface of the porous hollow fiber substrate and the treated composite is then dried to remove solvents. Another procedure is that wherein the porous substrate is dipped into a prepolymer solution, the dipped composite is then drained and contacted with a crosslinking composition, and this final composite is subjected to elevated temperature to cure the coating. Many modifications have been made to these basic procedures in attempts to resolve some of the deficiencies encountered, e.g., voids, pinholes, non-uniformity of deposit. Other procedures involve impregnation of bundles of hollow fibers by various techniques.

In accordance with this invention there are provided processes for coating the surface of a porous substrate to produce composite semi-permeable membranes suitable for fluid separations. These processes involve coating a surface of a porous substrate with a dilute solution of solvent and the membrane-forming material, partially drying the coated porous substrate and then contacting it with a coagulating solution that is a non-solvent for the membrane-forming material and a solvent for the solvent of the solution and recovering the composite membrane.

The composite membranes produced by the process of this invention generally possess a more uniform coating of the thin membrane separation layer, or membrane-forming material, on the porous substrate that is essentially free of voids and pinholes. Since the coating is more uniform, it is believed to be significantly smoother and thinner than coatings heretofore achieved by the prior known processes. In the prior evaporation coating techniques it is believed the surface of the coated material is an undulating surface, such as seen in a rolling meadow, with recessed and elevated sections; this resulting from the hydrodynamics of coating and from uneven evaporation of the solvent during the drying step or from uneven application of coating material or crosslinking agent to the porous substrates. In the process of this invention, as the porous substrate that has been coated with the membrane-forming material passes through the coagulation bath, the shear forces generated between the solvent-containing membrane-forming material on the porous substrate and the liquid coagulation bath tend to even the surface of the membrane-forming material and generally fill in any voids and pinholes that may have been present to produce a more uniformly-coated composite essentially free of deficiencies often found in many composites produced by the stated prior art procedures. As a consequence after treatment is not required. It often may also be possible to obtain a thinner coating by the process of this invention.

The process of this invention also permits the use of a wider variety and number of solvents for preparing the membrane-forming solutions. In prior processes these solvents are necessarily mild since they are removed by evaporation, either at ambient temperature or, as is most often the case, at elevated temperature. Whichever temperature condition is used, however, it most be low enough that it does not affect the porous substrate. In the instant process temperature is not a significant factor since the solvent is removed in the coagulation bath and this preferably conducted at ambient temperature. Thus, solvents that could not be employed in the prior art processes because their removal would deleteriously affect the porous substrate can generally be used in the process of this invention. Thus an advantage of the process of this invention is that some porous substrates can now be coated that could not previously be coated because the substrate would have suffered degradation on drying.

The invention is further described herein, for convenience of description, with particular reference to hollow fiber or polysulfone hollow fiber composite membranes. It will be understood, however, the scope of the invention is not limited to the use of composite membranes in hollow fiber form. It is within the scope of the invention to employ any composite membrane composition prepared as herein described for use in desired fluid separation operations. In addition, such composite membrane compositions can be prepared, in accordance with this invention, in spiral wound, flat sheet, or other desired forms as well as in said hollow fiber form.

Those skilled in the art will appreciate that porous substrates have any of these forms and they are aware of the many methods available for their production and their ready commercial availability. For convenience, hollow fibers will be discussed. The hollow fibers, as disclosed by Ward, et al., have continuous channels for fluid flow extending between the exterior and interior surfaces. Frequently, the pores have an average cross-sectional diameter less than about 20,000 and in some hollow fibers the cross-sectional diameter is less than about 1,000 or 5,000 angstroms. Particularly advantageous hollow fibers, especially for gas separations wherein the material of the hollow fiber effects a significant portion of the separation, such as disclosed by Henis, et al., in the above-recited patent applications, the average pore cross-sectional diameter is about 5 to 200 angstroms. Often the ratio of total surface area to total pore cross-sectional area of the hollow fiber is at least about 10:1. For membranes for gas separations, especially in those membranes in which a significant portion of the separation is effected by the material of the hollow fiber, the ratio of total surface area to total pore cross-sectional area of the hollow fiber is at least about $10^3:1$, and some hollow fibers may have ratios of about $10^3:1$ to $10^8:1$.

Advantageously, the walls of the hollow fibers are sufficiently thick that no special apparatus is required for their handling. Frequently, the hollow fibers may have outside diameters of about 20 to 1,000 microns, say, about 50 to 1,000, e.g., about 250 to 1,000 microns, and have walls of at least about 5 microns in thickness. The wall thickness in some hollow fibers may be up to about 200 or 300 microns. In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fibers is less than the density of the bulk materal of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions, of the hollow fiber. The density of the hollow fiber can be essentially the same throughout its thickness, i.e., isotropic, or the hollow fiber can be characterized by having at least one relatively dense region within its thickness in barrier relationship to fluid flow through the wall of the hollow fiber, i.e., the hollow fiber is anisotropic. Generally, a relatively dense region of anisotropic hollow fibers is substantially at the exterior of the hollow fiber, and, preferably, the coating contacts this relatively dense region.

The material used for the hollow fiber may be a solid natural or synthetic substance. The selection of the material for the hollow fiber may be based on the heat resistance, solvent resistance, and/or mechanical strength of the hollow fiber, as well as other factors dictated by the intended separation process in which it will be used and the operating conditions to which it will be subjected. Thus, for instance, the selection of the material of the hollow fiber may be based on whether or not the material of hollow fiber is intended to significantly effect the fluid separation, in which event the material of the hollow fiber has useful separation properties, or whether the coating is intended to effect the fluid separation. The hollow fibers may be flexible or substantially rigid. The material used for the hollow fibers may be inorganic to provide, e.g., hollow glass, ceramic, cermet, sintered metal, or the like, fibers. In the case of polymers, both addition and condensation polymers which can be fabricated in any suitable manner to provide porous hollow fibers are included. Generally organic, or organic polymers mixed with inorganic materials (e.g., fillers), are used to prepare the hollow fibers. Typical polymers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate; cellulose-acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles, poly(benzimidazole); polycarbodiimides; polyphosphazines; etc., and interpolymers, including block terpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The thin membrane separation layer or membrane-forming material deposited on the porous substrate is generally applied as a solution in a suitable solvent. Those skilled in the art appreciate that many such materials are available and that some exhibit selectivities to some fluid mixtures and not to others. This is of no consequence to this invention since the process of this invention is directed to producing composite membranes. The Ward, et al. patent contains a fairly comprehensive disclosure of membrane-forming organic synthetic substances that can be used in this invention to the extent a suitable solution can be prepared.

Typical of the useful materials are polymers which can be substituted or unsubstituted. The materials include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile-containing copolymers such as poly($\alpha$-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; cellulosic polymers; polysulfones, especially aliphatic-containing polysulfones; poly(alkylene glycols) such as poly(ethylene glycol), poly(propylene glycol), etc., poly(alkylene) polysulfates; polypyrrolidones; polymers from monomers having $\alpha$-olefinic unsaturation such as poly(olefins), e.g., poly(ethylene), poly(propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral), poly(vinyl ketones) (e.g. poly(methyl vinyl ketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinyl maleimide)., etc.; poly(1,5-cyclooctadiene); poly(methyl isopropenyl ketone); fluorinated ethylene copolymers; poly(arylene oxides), e.g., poly(xylylene oxide); polycarbonates; polyphosphates, e.g., poly(ethylene methyl phosphate);

and the like, and any interpolymers including block interpolymers containing repeating units from the above, and grafts and blends containing any of the foregoing, and monomers of the above-mentioned polymers.

Additional useful materials include the poly(siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1,000. Often, the poly(siloxanes) have a molecular weight of about 1,000 to 300,000 when applied to the hollow fiber membrane. Common aliphatic and aromatic poly(siloxanes) include the poly(monosubstituted and disubstituted siloxanes), e.g., wherein the substituents are lower aliphatic, for instance, lower alkyl, including cycloalkyl, especially methyl, ethyl, and propyl, lower alkoxy, aryl including mono or bicyclic aryl including phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups and the like. Some poly(siloxanes) do not sufficiently wet a hollow fiber, e.g., a polysulfone hollow fiber, to provide as much desired contact as is desired. However, dissolving or dispersing the poly(siloxane) in a solvent for the poly(siloxane) which does not substantially affect the polysulfone can facilitate obtaining contact. Suitable solvents include normally liquid alkanes, e.g., pentane, cyclohexane, etc.; aliphatic alcohols, e.g., methanol; some halogenated alkanes and halogenated dialkyl ethers; and dialkyl ethers; and the like; and mixtures thereof.

As indicated previously, the membrane-forming material is applied to the surface of the porous substrate from a solution, the membrane-forming solution. This is generally performed by passing or immersing the porous substrate surface through the solution. It is to be understood that the porous substrate can be either dry or prewetted with a liquid which is compatible with the solvent used in preparing the membrane-forming solution. Any suitable solvent or mixture of solvents for the membrane-forming material can be used and those skilled in the art appreciate and know which solvent is suitable for a particular membrane-forming material. The solvent is one which will dissolve the membrane-forming material and can be inorganic or organic and able to produce a homogeneous or uniform solution. The solvent used to prepare the solution of the membrane-forming material can also be a mixture of one or more solvents that will dissolve the membrane-forming material and one or more non-solvent for the membrane-forming material. Such mixtures are generally preferred. The important consideration, whether a single solvent or a mixture of solvent and non-solvent is used, is that the solution of the membrane-forming solution is preferably essentially a homogeneous or uniform solution. The solution should be of a low enough viscosity that it will be easily applied as an even coating on the porous substrate and wets the porous substrate surface. The viscosity at application temperature can vary from less than about 50 centipoise and is generally from about 0.05 to about 10 to 20 centipoise. The concentration of membrane-forming material in the membrane-forming solution can vary from about 0.25 to about 10 percent by weight of said solution.

Illustrative of materials that can be used to prepare the solution are the liquid aliphatic and aromatic hydrocarbons, e.g., benzene, toluene, pentane, hexane, 2-ethylhexane, cyclopentane, methylcyclopentane, cyclohexane, etc.; alkanols, e.g., methanol, ethanol, the propanols, the butanols, cyclopentanol, cyclohexanol, benzyl alcohol, etc.; ketones, e.g., acetone, dimethyl ketone, diethyl ketone, methyl ethyl ketone, etc.; acids, e.g., acetic acid, propionic acid, hydrochloric acid, etc.; water; esters, e.g., ethyl acetate, etc.; halogenated alkanes and dialkyl ethers; dialkyl ethers; and the like; mixtures thereof may also be used. In some instances one of said materials in the mixture may be the solvent for the membrane-forming material while the other of said materials may be the non-solvent; in other instances both components may be solvents for the membrane-forming material.

A preliminary laboratory test that can be used to determine the suitability of a particular material as a solvent for the membrane-forming solution to be used to apply the coating to the porous substrate can be performed by applying the material to be tested alone to the porous substrate and passing the treated substrate through the coagulation bath. A suitable material would not significantly affect the substrate but one that is not suitable will. Using this test one can select materials that can be used in the process of this invention but would not be suitable in prior art processes that required heating to remove the solvent material from the surface of the porous substrate because heating quite often had a deleterious effect, especially when the temperature required was too high. It also permits selection of non-volatile solvents, e.g., strong mineral acids or high boiling materials, when these would be the only solvents suitable for dissolving the membrane-forming polymeric material because they could be readily removed by the coagulation bath.

As previously indicated, after the porous substrate has been coated with the solution of the membrane-forming material the coated porous substrate is eventually passed through a coagulation bath. The coagulation bath contains a liquid material that is a non-solvent for the polymeric membrane-forming material but is a solvent for the solvent used to prepare the solution of the polymeric membrane-forming material. In other words, the solvent of the coating material will be soluble in the coagulation bath but the polymeric membrane-forming material is essentially insoluble in the coagulating bath. This coagulation phenomenon is well known to those skilled in the art, as it is to any ordinary scientist. Thus, once knowing which solvent was used to dissolve the membrane-forming material the ordinary skilled scientist has no problem in selecting a suitable coagulant solvent for the coagulation bath. Generally, when a mixture of solvent and non-solvent is used to prepare the solution of membrane-forming material, the coagulation bath can be the same non-solvent. Consequently, the specific composition of the coagulation bath will vary with the particular composition being applied to the porous substrate, a fact obvious to those familiar with this coagulation phenomenon.

The following description represents one means of carrying out the process of this invention. It is apparent that this is not the only manner of doing so and should not be construed thusly; also, for convenience of description porous hollow fibers are employed.

The process begins by passing the porous hollow fibers, either wet or pre-dried, through a solution of membrane-forming material, prepared as previously described, at a temperature of from about 0° C. or less to about 70° C. or more, preferably at ambient temperature. Any temperature can be used provided it does not have a deleterious affect on the porous substrate or the coating. The fibers exit downwardly from the base of the vessel containing the solution of membrane-forming material through an appropriate die-means as separate fibers, that is, they exit as individual fibers and do not come into contact with one another. Such die-means are well-known in the art and are commercially available or readily constructed. The separated fibers exiting from the die continue downwardly and are exposed to a drying step, preferably by passing through air at ambient conditions for a period of from about 1 to about 80 seconds, preferably from about 10 to about 20 seconds. Any other gaseous atmosphere can be used provided it does not deleteriously affect the product. The extent of this drying period will vary to some degree with the particular system used to coat the porous substrate and the temperature at which drying occurs since temperatures below or above ambient can be used if desired. It is important that some evaporation or drying of the solvent occur and it is equally important that complete drying does not occur. A critical feature is that some residual solvent from the membrane-forming solution be retained on the coated porous substrate, generally from about 10 to 90 weight percent, and most frequently from about 30 to 70 weight percent, at the time it enters the coagulation bath. It is equally important that during the drying period the downwardly moving coated fibers have not contact with one another or any other solid surface after they have exited from the die-means until after they have passed through the coagulation bath otherwise imperfections may form on the coated prorous substrate. Following the brief drying step, the separated fibers enter the coagulation bath. Again this may be below or above ambient temperature conditions, e.g., about 0° C. or less to about 75° C. or more, but ambient temperature is preferred. This bath is of sufficient size that coagulation of the membrane-forming material on the surface of the porous substrate is complete before the coated porous substrate makes contact with a solid surface. Simultaneous with this coagulation the solvent present in the membrane-forming solution is dissolved into the coagulating bath. After coagulation has been accomplished the separated fibers pass around a pulley located at the bottom of the coagulation bath, reverse their direction and ascend and exit the bath. They then exit through pulley and fiber separator means and the hollow fiber composite membrane is collected on a winding spool, either wet or after a drying step.

For maximum benefit during the fluid separation in which the composite membranes produced by the process of this invention are used one ordinarily prefers to employ the high selectivity coating naterials for coating the porous substrate. These have high selectivity values and many are identified in Polymer Handbook, published by John Wiley & Sons, New York, 1975. When high flux is desired, however, one may choose to use a material having a lower selectivity. These aspects of membrane technology are known to those skilled in the art.

The thin membrane applied to the surface of the porous substrate by the process of this invention has a thickness of from about 500 to about 7,000 angstroms, preferably from about 750 to about 2,000 angstroms.

Among the advantages achievable by the process of this invention are the ability to produce permeable membranes that are thinner than those heretofore obtainable, membranes that have a more uniform surface, membranes that are essentially free of voids and pinholes, the ability to coat polymers that would be damaged or dissolved by the solvent used to prepare the membrane coating solution and the ability to use higher boiling solvents for the membrane forming composition. As a consequence the composite membranes generally have improved selectivity, flux and permeation rates.

As used herein, it will be understood that the selectivity, or separation factor, of a membrane or membranes module assembly represents the ratio of the permeate rate of the more permeable to the less permeable component of a mixture being separated and the permeability is expressed in $ft^3(STP)/ft^2 \cdot day \cdot psi$.

The following examples serve to further illustrate this invention.

EXAMPLE 1

A spun polysulfone porous hollow fiber was dried at about 115° C. and was then passed through a hot-air oven at about 182° C. for a residence time of 10 seconds. This process resulted in the formation of an asymmetric substrate.

A membrane-forming solution of 1.5 weight percent cellulose acetate in a 50/50 by volume solvent mixture of acetic acid and isopropanol was prepared and filtered into a vessel equipped with a multi-hole die at its base. The polysulfone porous hollow fibers prepared above were coated as previously described. They were passed through the cellulose acetate solution at a rate of five feet per minute to coat the fibers at room temperature and exited from the die orifices. The solution-coated composite hollow fibers exited through their individual holes or orifices in the die and proceeded downwardly in air for 14 seconds to evaporate solvents at ambient temperature without contact with one another or any solid surface. They were then immersed in a 10 liter container of isopropanol, at ambient temperature, as the coagulant bath. Isopropanol is a non-solvent for the cellulose acetate and a solvent for the acetic acid/isopropanol solvents mixture. After coagulation the composite polysulfone porous hollow fiber membranes coated with cellulose acetate were recovered as previously described.

The composite hollow fibers membranes were formed into sixteen strand, eight inch long fluids separation modules by conventional means for test purposes.

The composite polysulfone porous hollow fiber membrane modules were tested for gas separation characteristics with a mixed gas feed of 30.5 volume percent hydrogen and 69.5 volume percent nitrogen at 200 psi and 25° C. The average selectivity for hydrogen separation between hydrogen and nitrogen was 59; the average permeation rate (P/t) of hydrogen was 0.92 $ft^3(STP)/ft^2 \cdot day \cdot psi$.

The same polysulfone hollow fibers were coated with the cellulose acetate membrane forming solution at varying coating speeds to vary the air evaporation time. Fluids separation modules were prepared and tested in the same manner described above. Table I summarizes the results.

TABLE I

| Run | Coating Speed fpm | Air Evap. Time, sec. | Selectivity (average) | P/t (average) |
|---|---|---|---|---|
| a | 5 | 14 | 59 | 0.94 |
| b | 10 | 7 | 44 | 1.2 |
| c | 20 | 3.5 | 44.5 | 1.2 |

As can be seen the best overall results in selectivity between hydrogen and nitrogen and permeation rate (P/t) are obtained with a 14 seconds air drying or air evaporation time. At shorter air drying times selectivity is lower but permeation rate is higher.

COMPARATIVE EXAMPLE A

For comparative purposes a module was prepared using the asymmetric polysulfone porous hollow fibers of Example 1 without application of a cellulose acetate coating and tested for hydrogen separation characteristics as described in Example 1. The average selectivity between hydrogen and nitrogen was 3.3 and the average permeation rate was 10 0.92 $ft^3(STP)/ft^2 \cdot day \cdot psi$. The separation was carried out at 25 psi and 26° C.

COMPARATIVE EXPERIMENT B

For comparative purposes a module was prepared using the polysulfone porous hollow fibers of Example 1 prior to undergoing the heating step and without application of a cellulose acetate coating and tested for hydrogen separation characteristics as described in Comparative Experiment A. The average selectivity between hydrogen and nitrogen was 1.3 and the average permeation rate was 140 $ft^3(STP)/ft^2 \cdot day \cdot psi$.

Comparison of the permeation rate of Comparative Experiment A with that of Example 1 shows that the Comparative Experiment has a significantly higher permeation rate or flux. However, selectivity is considerably lower, at 3.3 in Comparative Experiment A and from about 44 to about 59 in Example 1. Thus, when the objective is separation of one gas from another, in this instance hydrogen from nitrogen, the membranes produced by the process of this invention are significantly superior; high flux or permeation rate did not give a satisfactory separation.

EXAMPLE 2

A membrane-forming solution of 1.0 weight percent cellulose acetate in a 50/50 by volume solvent mixture of acetic acid and isopropanol was prepared. Following the procedure described in Example 1 the polysulfone porous hollow fibers described in Example 1 were coated with this solution. The composite polysulfone porous hollow fiber membranes coated with the cellulose acetate that were produced were used to prepare fluids separation modules and tested for gas separation characteristics between hydrogen and nitrogen following the procedures described in Example 1. Table II summarizes the data and results.

TABLE II

| Run | Coating Speed fpm | Air Evap. Time, sec. | Selectivity (average) | P/t (average) |
|---|---|---|---|---|
| a | 5 | 14 | 59.5 | .76 |
| b | 10 | 7 | 50 | .82 |
| c | 20 | 3.5 | 47 | 1.25 |

It is observed that selectivity decreases as air evaporation time decreases, with an air evaporation time of 14 seconds exhibiting best selectivity with membranes prepared by the process of this invention with this system.

EXAMPLE 3

A membrane-forming solution of 0.75 weight percent cellulose acetate in a 50/50 by volume solvent mixture of acetic acid and isopropanol was prepared. Following the procedure described in Example 1 the polysulfone hollow fibers described in Example 1 were coated with this solution. The composite polysulfone porous hollow fiber membranes coated with the cellulose acetate that were produced were used to prepare fluid separation modules and tested for gas separation characteristics between hydrogen and nitrogen following the procedure described in Example 1. Table III summarizes the data and results.

TABLE III

| Run | Coating Speed fpm | Air Evap. Time, sec. | Selectivity (average) | P/t (average) |
|---|---|---|---|---|
| a | 5 | 14 | 56.5 | 1.2 |
| b | 10 | 7 | 49.5 | 1.1 |
| c | 20 | 3.5 | 40 | 1.35 |

It is to be noted, selectivity decreases as air evaporation time decreases, with an air evaporation time of 14 seconds exhibiting best selectivity with membranes prepared by the process of this invention with this system.

It is also to be noted that the concentration of cellulose acetate in the membrane-forming solution has little or no effect on selectivity or permeation rate on the composite polysulfone porous hollow fiber membranes produced by the process of this invention and that in all instances selectivities were better than those achieved in either Comparative Experiment A or Comparative Experiment B.

EXAMPLE 4

A membrane-forming solution of 1.5 weight percent brominated polyphenylene oxide in carbon tetrachloride was prepared and filtered and placed into a vessel equipped with a multi-hole die at its base. Following the procedure described in Example 1 the polysulfone hollow fibers described in Example 1 were coated with this solution using a 14 seconds air evaporation time at ambient temperature. The composite polysulfone porous hollow fiber membranes coated with the brominated polypheylene oxide that were produced were used to prepare fluids separation modules and tested for gas separation characteristics between oxygen and nitrogen using air as the feed at 25° C. and 100 psi. The average selectivity for oxygen separation between oxygen and nitrogen was 4.2 and the average permeation rate of oxygen was 0.17 $ft^3(STP)/ft^2 \cdot day \cdot psi$.

EXAMPLE 5

A membrane-forming solution of 1.5 weight percent tetramethyl bisphenol-A polysulfone polymer in a 50/50 by volume solvent mixture of 1,1,1-trichloroethane and carbon tetrachloride was prepared and filtered. Following the procedure described in Example 1 the polysulfone hollow fibers described in Example 1 were coated with this solution, air dried at ambient temperature for 14 seconds and immersed in a 10 liter container of isopropanol as the coagulating bath. Isopropanol is a non-solvent for the tetramethyl bisphenol-A polysulfone and a solvent for the 1,1,1-trichloroethane/carbon tetrachloride solvent mixture. The composite polysulfone porous hollow fiber membranes coated with the tetramethyl bisphenol-A polysulfone were used to prepare fluid separation modules and tested for gas separation characteristics between hydrogen and nitrogen using air as the feed at 25° C. and 100 psi. The average selectivity for oxygen separation between oxygen and nitrogen was 3.9 and the average permeation rate of oxygen was 0.11 ft$^3$(STP)/ft$^2$·day·psi.

What is claimed is:

1. A process for forming a composite hollow fiber membrane for fluid separation comprising:
   (i) coating a preformed porous hollow fiber substrate with a membrane-forming material and a solvent therefor by applying said composition to said porous hollow fiber substrate;
   (ii) conveying the porous hollow fiber substrate coated with said composition through a gaseous atmosphere to evaporate some but not all of the solvent in said composition from the surface of said coated porous hollow fiber substrate;
   (iii) conveying such partially dried coated porous hollow fiber substrate whose coated surface has made no contact with a solid surface from the time said membrane-forming composition solution was applied to the surface of the porous hollow fiber substrate into a liquid coagulation bath wherein the membrane-forming material is coagulated on the surface of said porous hollow fiber substrate and the solvent for said membrane-forming material is dissolved in the liquid coagulation bath; and
   (iv) recovering a composite hollow fiber membrane having a coating with a thin, substantially smooth membrane separation layer, having a thickness down to about 500 angstroms, on said porous substrate, said thin, smooth membrane separation layer being essentially free of voids and pinholes.

2. A process for forming a composite hollow fiber membrane as claimed in claim 1, wherein said solvent solution comprises one or more solvents for the membrane-forming material.

3. A process for forming a composite hollow fiber membrane as claimed in claim 1, wherein said solvent solution comprises one or more solvents for the membrane-forming material and one or more non-solvents for the membrane-forming material.

4. A process for forming a composite hollow fiber membrane as claimed in claim 1, wherein the temperature of said membrane-forming composition is from about 0° C. to about 70° C.

5. A process for forming a composite hollow fiber membrane as claimed in claim 1, wherein the temperature of said membrane-forming composition is ambient temperature.

6. A process for forming a composite hollow fiber membrane as claimed in claim 1, wherein drying step (ii) is for about 1 to 80 seconds.

7. A process for forming a composite hollow fiber membrane is claimed in claim 1, wherein drying step (ii) is for about 10 to 20 seconds.

8. A process for forming a composite hollow fiber membrane as claimed in claim 1, wherein the temperature of said liquid coagulation bath is from about 0° C. to about 75° C.

9. A process for forming a composite hollow fiber membrane as claimed in claim 1, wherein the temperature of said liquid coagulation bath is ambient temperature.

10. A process for forming a composite hollow fiber membrane as claimed in claim 1, wherein the membrane-forming material comprises from about 0.25 to about 10 weight percent of the membrane-forming composition.

11. The process of claim 1, wherein the membrane-forming material is cellulose acetate.

12. The process of claim 1, wherein the membrane-forming material is brominated polyphenylene oxide.

13. The process of claim 1, wherein the membrane-forming material is tetramethyl bisphenol-A polysulfone polymer.

14. The process of claim 1, wherein the preformed porous hollow fiber substrate surface has bene prewet before coming into contact with said membrane-forming composition.

15. The process of claim 1 wherein the porous hollow fiber substrate is polysulfone.

16. The process of claim 1 in which said thin separation layer has a thickness down to about 700 angstroms.

17. A composite hollow fiber membrane for fluid separation comprising a coating and a porous hollow fiber substrate, said composite hollow fiber membrane produced by:
   (i) coating a preformed porous hollow fiber substrate with a membrane-forming composition comprising a solution containing a membrane-forming material and a solvent therefor by applying said composition to said porous hollow fiber substrate;
   (ii) conveying the porous hollow fiber substrate coated with said composition through a gaseous atmosphere to evaporate some but not all of the solvent in said composition from the surface of said coated porous hollow fiber substrate;
   (iii) conveying such partially dried coated porous hollow fiber substrate whose coated surface has made no contact with a solid surface from the time it left said membrane-forming composition solution was applied to the surface of the porous hollow fiber substrate into a liquid coagulation bath wherein the membrane-forming material is coagulated on the surface of said porous hollow fiber substrate and the solvent for said membrane-forming material is dissolved in the liquid coagulation bath; and
   (iv) recovering a composite hollow fiber membrane having a coating with a thin, substantially smooth membrane separation layer, having a thickness down to about 500 angstroms, on said porous substrate, said thin, smooth membrane separation layer being essentially free of voids and pinholes.

18. A composite hollow fiber membrane for fluid separation as claimed in claim 17, wherein the membrane-forming composition used to produce said composite hollow fiber membrane comprises a membrane-forming material and one or more solvents for the membrane-forming material.

19. A composite hollow fiber membrane for fluid separation as claimed in claim 17, wherein the membrane-forming composition used to produce said composite membrane comprises a membrane-forming material and one or more non-solvents for the membrane-forming material.

20. A composite hollow fiber membrane for fluid separation as claimed in claim 17, wherein the membrane-forming material is cellulose acetate.

21. A composite hollow fiber membrane for fluid separation as claimed in claim 17, wherein the membrane-forming material is brominated polyphenylene oxide.

22. A composite hollow fiber membrane for fluid separation as claimed in claim 17, wherein the membrane-forming material is tetramethyl bisphenol-A polysulfone polymer.

23. A composite hollow fiber membrane for fluid separation as claimed in claim 17, wherein the porous hollow fiber substrate is polysulfone.

24. The composite hollow fiber membrane of claim 17 in which said thin separation layer has a thickness down to about 700 angstroms.

25. A process for separating at least one fluid in a fluid mixture from at least one other fluid in said fluid mixture by selective permeation which comprises contacting the fluid mixture with a selectively permeable composite hollow fiber membrane comprising a coating and a porous hollow fiber substrate, said composite hollow fiber membrane produced by:
  (i) coating a preformed porous hollow fiber substrate with a membrane-forming composition comprising a solution containing a membrane-forming material and a solvent therefor by applying said composition to said porous hollow fiber substrate;
  (ii) conveying the porous hollow fiber substrate coated with said composition through a gaseous atmosphere to evaporate some but not all of the solvent in said composition from the surface of said coated porous hollow fiber substrate;
  (iii) conveying such partially dried coated porous hollow fiber substrate whose coated surface has made no contact with a solid surface from the time said membrane-forming composition solution was applied to the surface of the porous hollow fiber substrate into a liquid coagulation bath wherein the membrane-forming material is coagulated on the surface of said porous hollow fiber substrate and the solvent for said membrane-forming material is dissolved in the liquid coagulation bath; and
  (iv) recovering a composite membrane having a coating with a thin, substantially smooth membrane separation layer, having a thickness down to about 500 angstroms, on said porous substrate, said thin, smooth membrane separation layer being essentially free of voids and pinholes.

26. A process for separating at least one fluid in a fluid mixture from at least one other fluid in said fluid mixture as claimed in claim 25, wherein the membrane-forming composition used to produce said composite hollow fiber membrane comprises a membrane-forming material and a solvent solution therefor.

27. A process for separating at least one gas in a gaseous mixture from at least one other gas in said gaseous mixture as claimed in claim 25, wherein the membrane-forming composition used to produce said composite hollow fiber membrane comprises a membrane-forming material and one or more solvents for the membrane-forming material.

28. A process for separating at least one fluid in a fluid mixture from at least one other fluid in said fluid mixture as claimed in claim 25, wherein the membrane-forming composition used to produce said composite hollow fiber membrane comprises a membrane-forming material, one or more solvents for the membrane-forming material and one or more non-solvents for the membrane-forming material.

29. A process for separating at least one fluid in a fluid mixture from at least one other fluid in said fluid mixture as claimed in claim 25, wherein said porous hollow fiber substrate is polysulfone.

30. A process for separating at least one fluid in a fluid mixture from at least one other fluid in said fluid mixture as claimed in claim 25, wherein the membrane-forming material is cellulose acetate.

31. A process for separating at least one fluid in a fluid mixture from at least one other fluid in said fluid mixture as claimed in claim 25, wherein the membrane-forming material is brominated polyphenylene oxide.

32. A process for separating at least one fluid in a fluid mixture from at least one other fluid in said fluid mixture as claimed in claim 25, wherein the membrane-forming material is tetramethyl bisphenol-A polysulfone polymer.

33. The process of claim 25 in which said thin separation layer has a thickness down to about 700 angstroms.

* * * * *